(12) United States Patent
Logan et al.

(10) Patent No.: US 12,434,044 B2
(45) Date of Patent: Oct. 7, 2025

(54) MOTOR FOR EXTRACORPOREAL BLOOD PUMP, EXTRACORPOREAL BLOOD PUMP, AND EXTRACORPOREAL BLOOD PUMP SYSTEM

(71) Applicant: Magassist, Inc., Jiangsu (CN)

(72) Inventors: Thomas George Logan, Jiangsu (CN); Peter Colton James Clifton, Jiangsu (CN); Bo Wei, Jiangsu (CN); Ifan Yen, Jiangsu (CN)

(73) Assignee: Magassist, Inc., Jiangsu (CN)

( * ) Notice: Subject to any disclaimer, the term of this patent is extended or adjusted under 35 U.S.C. 154(b) by 396 days.

(21) Appl. No.: 17/777,928

(22) PCT Filed: Dec. 17, 2019

(86) PCT No.: PCT/CN2019/125819
§ 371 (c)(1),
(2) Date: May 18, 2022

(87) PCT Pub. No.: WO2021/097973
PCT Pub. Date: May 27, 2021

(65) Prior Publication Data
US 2023/0021792 A1    Jan. 26, 2023

(30) Foreign Application Priority Data
Nov. 18, 2019 (CN) .......................... 201911124056.7

(51) Int. Cl.
*A61M 60/538* (2021.01)
*A61M 60/104* (2021.01)
(Continued)

(52) U.S. Cl.
CPC ........ *A61M 60/538* (2021.01); *A61M 60/104* (2021.01); *A61M 60/216* (2021.01);
(Continued)

(58) Field of Classification Search
CPC .............. A61M 60/538; A61M 60/104; A61M 60/216; A61M 60/816; F04D 13/02
See application file for complete search history.

(56) References Cited

U.S. PATENT DOCUMENTS 6,351,048 B1   2/2002   Schob et al.
6,450,786 B1   9/2002   Koch et al.
(Continued)

FOREIGN PATENT DOCUMENTS

CN         1500928 A      6/2004
CN       102458498 A      5/2012
(Continued)

*Primary Examiner* — Carl H Layno
*Assistant Examiner* — Maria Catherine Anthony
(74) *Attorney, Agent, or Firm* — Flaster Greenberg P.C.

(57) ABSTRACT

The present disclosure relates to a motor for an extracorporeal blood pump, an extracorporeal blood pump, and an extracorporeal blood pump system. The motor for an extracorporeal blood pump comprises: a housing; an actuator located in the housing and used for driving an impeller in a pump head of the extracorporeal blood pump; at least one sensor located in the housing; and a motor driving-control assembly located in the housing and used to control operation of the motor. Integrating the motor driving-control assembly into the housing of the motor can significantly reduce the dependence of the motor on the control host of the extracorporeal blood pump, the risk of communication failure between the motor and the control host, and the risk of malfunction of the motor driving-control assembly, thereby greatly improving the safety and reliability of the extracorporeal blood pump.

15 Claims, 8 Drawing Sheets

(51) Int. Cl.
*A61M 60/216* (2021.01)
*A61M 60/419* (2021.01)
*A61M 60/816* (2021.01)
*A61M 60/822* (2021.01)
*F04D 13/02* (2006.01)
*F04D 15/00* (2006.01)
*H02K 5/04* (2006.01)
*H02K 7/14* (2006.01)
*H02K 11/20* (2016.01)
*H02K 11/33* (2016.01)
*H05K 1/02* (2006.01)

(52) U.S. Cl.
CPC ........ *A61M 60/419* (2021.01); *A61M 60/816* (2021.01); *A61M 60/822* (2021.01); *F04D 13/02* (2013.01); *F04D 15/0066* (2013.01); *H02K 5/04* (2013.01); *H02K 7/14* (2013.01); *H02K 11/20* (2016.01); *H02K 11/33* (2016.01); *H05K 1/0277* (2013.01)

(56) References Cited

U.S. PATENT DOCUMENTS

| | | |
|---|---|---|
| 8,597,350 B2 | 12/2013 | Rudser et al. |
| 8,604,650 B2 | 12/2013 | Sadanaga et al. |
| 8,636,638 B2 | 1/2014 | Timms |
| 9,308,305 B2 | 4/2016 | Chen et al. |
| 9,694,123 B2 | 7/2017 | Bourque et al. |
| 9,919,089 B2 | 3/2018 | Garrigue |
| 10,376,162 B2 | 8/2019 | Edelman et al. |
| 10,653,544 B2 | 5/2020 | Forsell |
| 2003/0223879 A1 | 12/2003 | Yanai et al. |
| 2009/0041595 A1 | 2/2009 | Garzaniti et al. |
| 2014/0030122 A1 | 1/2014 | Ozaki et al. |
| 2014/0316269 A1 | 10/2014 | Zhang et al. |
| 2016/0065037 A1 | 3/2016 | Buerger et al. |
| 2017/0119946 A1* | 5/2017 | McChrystal ........ F04D 15/0077 |
| 2018/0243490 A1 | 8/2018 | Kallenbach et al. |
| 2019/0209755 A1 | 7/2019 | Nix et al. |
| 2019/0365973 A1* | 12/2019 | Flores ................. A61M 60/818 |
| 2020/0306433 A1 | 10/2020 | Heide et al. |

FOREIGN PATENT DOCUMENTS

| | | |
|---|---|---|
| CN | 102821797 A | 12/2012 |
| CN | 103155372 A | 6/2013 |
| CN | 103260666 A | 8/2013 |
| CN | 104936517 A | 9/2015 |
| CN | 105041783 A | 11/2015 |
| CN | 105191080 A | 12/2015 |
| CN | 105228563 A | 1/2016 |
| CN | 205698666 U | 11/2016 |
| CN | 106456853 A | 2/2017 |
| CN | 107073184 A | 8/2017 |
| CN | 107582047 A | 1/2018 |
| CN | 110312535 A | 10/2019 |
| CN | 110769867 A | 2/2020 |
| JP | 2002536582 A | 10/2002 |
| JP | 2005143632 A | 6/2005 |
| JP | 4484320 B2 | 6/2010 |
| JP | 2014060903 A | 4/2014 |
| JP | 2019524330 A | 9/2019 |
| KR | 20010011912 A | 2/2001 |
| TW | 201919721 A | 6/2019 |
| WO | 2014140283 A1 | 9/2014 |
| WO | 2015160991 A1 | 10/2015 |
| WO | 2018053504 A1 | 3/2018 |
| WO | 2018185330 A1 | 10/2018 |
| WO | WO-2019195480 A1 * | 10/2019 ............ A61M 60/13 |

* cited by examiner

MOTOR FOR EXTRACORPOREAL BLOOD PUMP, EXTRACORPOREAL BLOOD PUMP, AND EXTRACORPOREAL BLOOD PUMP SYSTEM

CROSS REFERENCE TO RELATED APPLICATIONS

This application is a 371 U.S. national phase of PCT international patent application number PCT/CN2019/125819, filed Dec. 17, 2019, which claims benefit and priority to Chinese patent application number 201911124056.7.1 filed Nov. 18, 2019. The disclosure of each aforementioned application is incorporated by reference herein in its entirety. Specifically, the entirety of PCT international patent application number PCT/CN2019/125819 is incorporated by reference herein. And, the entirety of Chinese patent application number 201911124056.7.1 is incorporated by reference herein.

TECHNICAL FIELD

The present disclosure generally relates to the field of medical instruments. More particularly, the present disclosure relates to a motor for an extracorporeal blood pump, an extracorporeal blood pump including the motor, and an extracorporeal blood pump system including the extracorporeal blood pump and a control host.

BACKGROUND ART

In the case where a heart loses its blood pumping function (such as in arrested heart surgery, acute cardiogenic shock, etc.), a blood pump may be used to replace the heart to assist in maintaining the blood circulation of human body. Blood pumps may be classified into implantable blood pumps and extracorporeal blood pumps depending on their implantability and clinical use. The implantable blood pumps, capable of being implanted into a patient's body to maintain circulation of the blood in the body temporarily or for a long term, are mainly used for transplantation-substituted treatment of patients suffering from end-stage heart failure. The extracorporeal blood pumps may be used in vitro, such that transitional life support and treatment can be provided with less trauma.

As shown in FIG. 1, an entire extracorporeal blood pump system typically includes a pump head 1, a motor 2 for driving the pump head 1, a control host 3 for controlling the motor 2, and a pipe 4 for enabling blood communication between the pump head 1 and a patient 5. The motor 2 and the control host 3 are reusable equipment, while the pump head 1 and the pipe 4 are disposable articles in contact with blood.

The pump head 1 is provided with an impeller therein, which promotes flow of the blood by rotation or other mechanical movements for moving the liquid, so as to assist or replace the heart to maintain circulation of the blood.

The motor 2 is provided an actuator therein. The actuator may be a coil capable of generating force by inducting electromagnetic field or a force generator in other forms, such that the motor 2 can drive the impeller in the pump head 1 to rotate by magnetic coupling or direct driving. In order to drive the impeller in the pump head 1 to rotate, the interior of the motor 2 typically further includes a contact-type mechanical bearing, an active or passive magnetic suspension bearing, or a suspension bearing of other types.

The control host 3 may include a system controller and a user interface. The system controller, as the core of the whole extracorporeal blood pump system, is used to control operation of the motor, display of the user interface, data processing and power management, and to execute various alarming and prompting functions required by clinic. The user interface may include an input component 6 and a display 7. The input component 6 is used for the user to perform input operation to control the motor or to execute other functions, and the display 7 may be used to display important hemodynamic parameters (such as blood pressure, flow rate, etc.) of the patient 5 as well as alarm information.

The control host 3 needs to be connected with an external AC power supply. In some cases, an uninterruptible power supply (for example, a DC power supply such as a rechargeable battery) may also be provided within the control host 3. The AC or DC power supply may be connected with the system controller, so as to power the control host itself and/or the motor via the system controller.

In use, the pump head 1 and the pipe 4 are connected to the circulation system of the patient through cannulas, and then the medical staff sets the auxiliary mode and degree by operating the user interface of the control host 3. The control host 3 transmits corresponding control signals to the motor 2 according to the preset auxiliary mode and degree, so as to control the motor 2 to perform corresponding operations.

However, it has been found in practice that, in the current extracorporeal blood pump system, the control host 3 is prone to malfunction and communication failure often occurs between the control host 3 and the motor 2, which disables normal operation of the whole extracorporeal blood pump system and thus endangers the patient's life. In view of this, the only measure currently taken is to replace the whole set of control host 3 and motor 2 (when a failure occurs during use, it is generally difficult to figure out the exact cause of the failure, and since the situation is urgent, the only measure is to replace the whole set of control host 3 and motor). From the point of view of risk control, such measure means that backup control hosts and motors need to be provided at any time. This not only limits the clinical use of the extracorporeal blood pump (for example, there is usually no room for arrangement of two sets of control hosts in ambulances), but also increases the risk of patients' death during the replacement process and increases the use cost of the extracorporeal blood pump.

CONTENT OF THE INVENTION

One of objects of the present disclosure is to solve one or more of the above problems and realize other additional advantages.

In a first aspect of the present disclosure, a motor for an extracorporeal blood pump is provided. The motor for the extracorporeal blood pump may comprise: a housing; an actuator located in the housing and used for driving an impeller in a pump head of the extracorporeal blood pump; at least one sensor located in the housing; and a motor driving-control assembly located in the housing and used to control operation of the motor.

According to an embodiment of the present disclosure, the motor driving-control assembly may comprise a sensor interaction circuit and a motor controller, wherein the sensor interaction circuit receives sensing signals from the sensor and transmits the sensing signals to the motor controller, and the motor controller sends corresponding control signals to the actuator based on the received sensing signals.

According to an embodiment of the present disclosure, the motor driving-control assembly may further include an amplifier, which amplifies the control signal from the motor controller and then transmits the amplified control signals to the actuator.

According to an embodiment of the present disclosure, the motor may further include a backup power supply integrated in the housing, wherein the backup power supply supplies electric power to the motor driving-control assembly and the actuator to maintain normal operation of the motor in case of failure of external power supplies.

According to an embodiment of the present disclosure, the motor driving-control assembly may be integrated on a circuit board.

According to an embodiment of the present disclosure, the circuit board may be configured as an integral structure.

According to an embodiment of the present disclosure, the circuit board may be arranged around the actuator in a circular, rectangular or an irregular shape.

According to an embodiment of the present disclosure, the circuit board may be arranged vertically or horizontally around the actuator.

According to an embodiment of the present disclosure, the circuit board may lie flat on one side of the actuator.

According to an embodiment of the present disclosure, the circuit board may include at least two rigid sections and a connection element for connecting the at least two rigid sections.

According to an embodiment of the present disclosure, each of the rigid sections may be used to perform a portion of driving-control functions of the motor driving-control assembly.

According to an embodiment of the present disclosure, the connection element may be configured as a flexible circuit board for transmitting signals and/or electric power between the at least two rigid sections.

According to an embodiment of the present disclosure, the connection element may be configured as a connection plug for transmitting signals and/or power between the at least two rigid sections.

According to an embodiment of the present disclosure, the connection element may be configured as a flexible circuit board for performing a portion of driving-control functions of the motor driving-control assembly.

According to an embodiment of the present disclosure, each of the at least two rigid sections may include a rigid circuit board layer and an extended flexible circuit board layer, wherein the rigid circuit board layer is arranged on at least one side of the flexible circuit board layer, and the flexible circuit board layers are connected together via the connection element.

According to an embodiment of the present disclosure, the circuit board may include a rigid circuit board layer and an extended flexible circuit board layer, wherein the rigid circuit board layer is arranged on at least one side of the flexible circuit board layer and includes two or more rigid sections separated from each other, such that the circuit board can be bent or folded by means of the flexible circuit board layer.

According to an embodiment of the present disclosure, the extended flexible circuit board layer is used to transmit signals and/or electric power, while the rigid circuit board layer is used to perform a portion of driving-control functions of the motor driving-control assembly.

According to an embodiment of the present disclosure, the circuit board may be arranged around the actuator in a general U-shape, or in rectangular, circular, semi-circular, or irregular shape.

According to an embodiment of the present disclosure, the circuit board may lie flat on one side of the actuator in a stacked manner.

According to an embodiment of the present disclosure, the motor driving-control assembly may comprise transistors and/or power integrated circuits, the transistors and/or the power integrated circuits being mounted on the circuit board. The transistors and/or the power integrated circuits may be in contact with the housing to allow heat from the transistors and/or the power integrated circuits to be dissipated through the housing; alternatively, the circuit board may be in contact with the housing, such that the heat from the transistors and/or the power integrated circuits can be dissipated through thermal paths formed on the circuit board and the housing.

According to an embodiment of the present disclosure, a heat dissipation enhancement structure may be arranged on an outer side of the housing.

According to an embodiment of the present disclosure, the heat dissipation enhancement structure may include at least one heat dissipation fin or rib.

According to an embodiment of the present disclosure, the housing may be of a T-shaped structure.

According to an embodiment of the present disclosure, the housing may be configured in one piece.

According to an embodiment of the present disclosure, the housing may be formed of a plurality of components.

According to an embodiment of the present disclosure, the housing may include a first housing and a second housing, with an outer circumference of the second housing being smaller than that of the first housing.

According to an embodiment of the present disclosure, the motor driving-control assembly may be at least partially located in the second housing.

According to an embodiment of the present disclosure, the housing may include a first housing and a second housing, both of which have T-shaped structures.

According to an embodiment of the present disclosure, the sensor may include a displacement sensor.

According to an embodiment of the present disclosure, the sensor may include a temperature sensor.

According to an embodiment of the present disclosure, the motor may be configured as a magnetic suspension motor with a magnetic suspension bearing for suspending a rotor of the impeller.

According to an embodiment of the present disclosure, the sensor may comprise a rotational displacement sensor for sensing a rotational speed of the rotor.

According to an embodiment of the present disclosure, the sensor includes an axial position and/or displacement sensor and/or a radial position and/or displacement sensor for sensing a suspending position of the rotor.

According to an embodiment of the present disclosure, the axial position and/or displacement sensor and/or the radial position and/or displacement sensor is/are eddy-current inductive position and/or displacement sensor(s).

According to an embodiment of the present disclosure, the motor may is include a user interface. The user interface may include an input component and an output component.

According to an embodiment of the present disclosure, the input component may include a speed setting element for implementing speed adjustment of the motor and/or starting and stopping of the motor.

According to an embodiment of the present disclosure, the output component may include at least one of a display, an indicator and an alarm.

According to an embodiment of the present disclosure, the motor may further include a signal converter.

In a second aspect of the present disclosure, an extracorporeal blood pump is provided. The extracorporeal blood pump may include a pump head, and a motor for the extracorporeal blood pump according to the present disclosure. The pump head may comprise an impeller with a rotor, and the motor drives the impeller to rotate via the rotor.

According to an embodiment of the present disclosure, the pump head and the motor may be configured to be separable from each other.

According to an embodiment of the present disclosure, the pump head may include two half shells. The impeller may be accommodated in an inner space formed by the two half shells.

In a third aspect of the present disclosure, an extracorporeal blood pump system is provided. The extracorporeal blood pump system may include a control host and an extracorporeal blood pump according to the present disclosure. The control host may comprise a power electronic circuit for transmitting electric power and command signals to the extracorporeal blood pump.

According to an embodiment of the present disclosure, the control host may be connected with the motor of the extracorporeal blood pump merely by one connection lead. The connection lead can not only transmit electric power, but also transmit command signals, to the motor of the extracorporeal blood pump.

The additional and/or other aspects and advantages of the present disclosure will be set forth in the following description, or are obvious from the description or can be learned through the practice of the present invention. The various technical features of the present disclosure can be combined arbitrarily as long as they do not contradict each other.

BRIEF DESCRIPTION OF THE DRAWINGS

With reference to the following detailed description of the specific embodiments of the present disclosure in combination with the accompanying drawings, the above-mentioned features and advantages and other features and advantages of the present disclosure as well as their implementing means will become more apparent. In the drawings.

Figure 1:
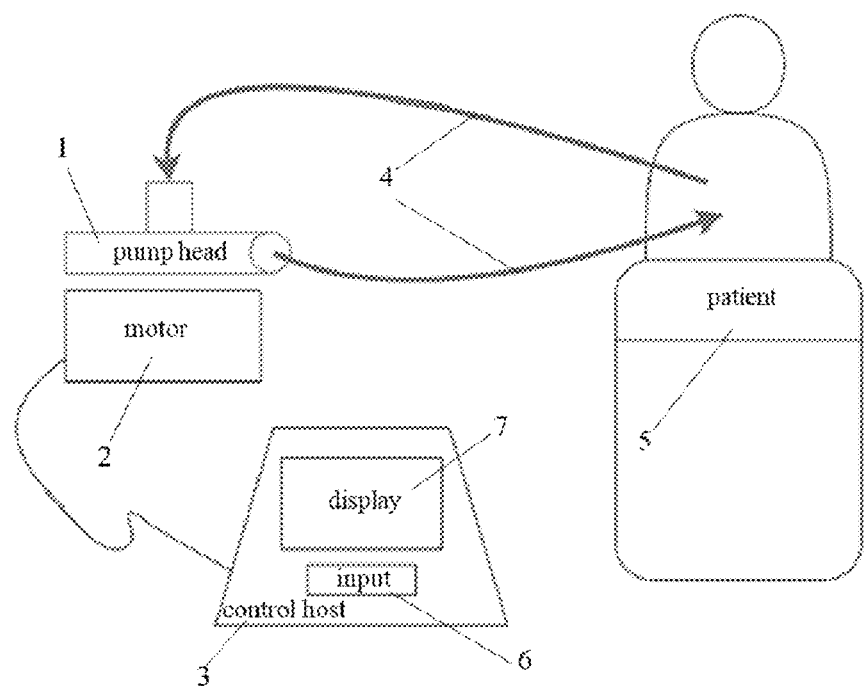
FIG. 1 is a schematic view of a prior art extracorporeal blood pump system.

In the drawings, respective reference signs indicate respective components. The examples described herein are used to illustrate exemplary aspects of the present invention, and these examples should not be construed as limiting the scope of the present disclosure in any way.

DETAILED EMBODIMENTS

The present disclosure will be described below with reference to the drawings, in which several embodiments of the present disclosure are shown. It should be understood, however, that the present disclosure may be implemented in many different ways and is not limited to the example embodiments described below. In fact, the embodiments described hereinafter are intended to make a more complete disclosure of the present disclosure and to adequately explain the scope of the disclosure to a person skilled in the art. It should also be understood that the embodiments disclosed herein can be combined in various ways to provide many additional embodiments.

For the purpose of description, the terms "upper", "lower", "left", "right", "vertical", "horizontal", "top", "bottom", "transverse", "perpendicular" and their derivatives are all related to the orientation in the drawings of the present disclosure. However, it should be understood that the present disclosure may adopt various alternative modifications, unless otherwise clearly indicated. For example, when the apparatus in the drawings is turned over, the features previously described as being "below" other features may be described to be "above" other features at this time. The apparatus may also be otherwise oriented (rotated 90 degrees or at other orientations) and the relative spatial relationships will be correspondingly altered.

The singular forms "a/an" and "the" as used in the specification, unless clearly indicated, all contain the plural forms. The words "comprising", "containing" and "including" used in the specification indicate the presence of the claimed features, but do not preclude the presence of one or more additional features. The wording "and/or" as used in the specification includes any and all combinations of one or more of the relevant items listed.

In the specification, when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being "directly on", "directly attached" to, "directly connected" to, "directly coupled" with or "directly contacting" another element, there are no intervening elements present. In the specification, references to a feature that is disposed "adjacent" another feature may have portions that overlap, overlie or underlie the adjacent feature.

The applicant found in the study that the motor driving-control assembly used to control a motor is the key to determine whether an extracorporeal blood pump system can operate reliably.

Specifically, in the prior art extracorporeal blood pump systems, due to the complicated structure and volume limitation of the motors, the motor drive control assemblies are all integrated in control hosts. This arrangement allows the control information of the control host and the AC or DC power supply to be conveniently and effectively transmitted to the motor driving-control assembly, and then pulse width modulation (PWM) signals and electric power, for example, are transmitted to actuators of the motor through connection lines.

However, the applicant has found that, in the case where the motor driving-control assembly is integrated in the control host, the motor has a strong dependence on the control host. Once the control host fails or there is a communication failure between the control host and the motor, the motor will stop running to disable normal operation of the whole extracorporeal blood pump system. As the control host has a low level of environmental protection and often encounters rough use conditions, its failure rate is very high in the extracorporeal blood pump, readily leading to abnormal operation of the motor.

Secondly, active or passive magnetic suspension bearings are increasingly used in the motors of the extracorporeal blood pumps to reduce the mechanical damage to blood. Compared with conventional motors with contact-type mechanical bearings, more degrees-of-freedom controls conducted on the motors with magnetic suspension bearings are needed. This requires the integration of more sensors in the motor, and thus needs increasing connection lines between the control host and the motor. Increasing the connection lines between the control host and the motor will greatly reduce the stability of the connection lines, thereby significantly increasing the risk of communication failure between the control host and the motor.

Figure 2:
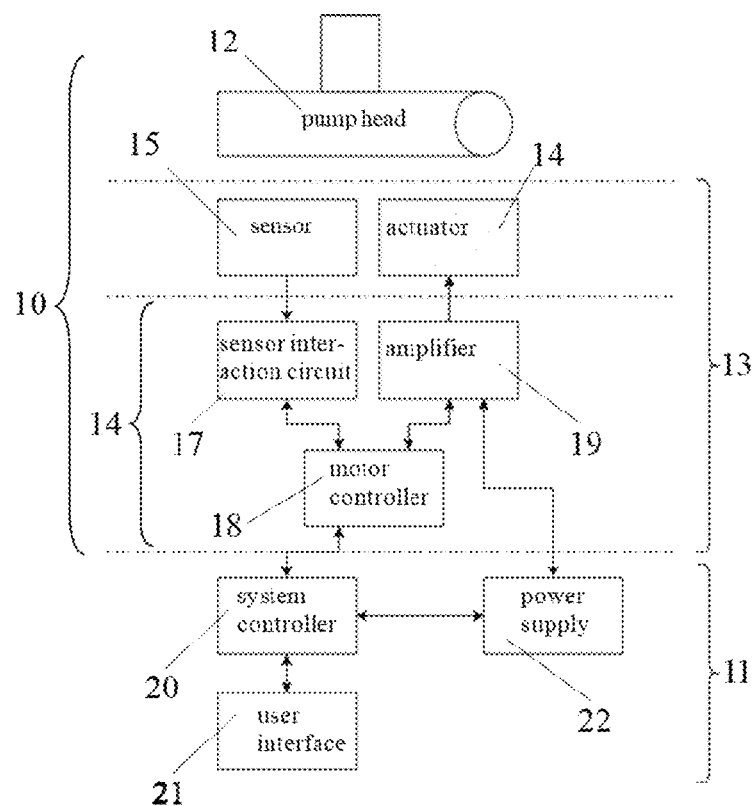
FIG. 2 is a schematic view of an extracorporeal blood pump system according to an embodiment of the present disclosure.

Thus, an extracorporeal blood pump system according to the present disclosure is provided. FIG. 2 is a schematic view showing an extracorporeal blood pump system according to an embodiment of the present disclosure. The extracorporeal blood pump system may include an extracorporeal blood pump 10 and a control host 11. The extracorporeal blood pump 10 may include a pump head 12, and a motor 13 for driving the pump head 12. The control host 11 is used to control the motor 13 of the extracorporeal blood pump 10.

The motor 13 may include an actuator 14, a sensor 15, and a motor driving-control assembly 16 integrated in the motor 13. The actuator 14 is used to drive the impeller of the pump head 12 to rotate so as to promote flow of the blood and thus assist or replace the heart to maintain circulation of the blood. The sensor 15 is used to sense information required for control of the motor 13 and transmit said information to the motor driving-control assembly 16. The motor driving-control assembly 16 is used to control operation of the motor 13.

In an embodiment according to the present disclosure, the motor driving-control assembly 16 may include a sensor interaction circuit 17, a motor controller 18, and an optional amplifier 19. The motor driving-control assembly 16 is capable of controlling the motor 13 in a closed loop. During the closed-loop control, the sensor 15 transmits the sensed information (such as the information on position, speed and force of the impeller, the information on temperature in the motor, etc.) in the form of electric signals to the sensor interaction circuit 17 of the motor driving-control assembly 16. These electric signals are filtered and amplified and then transmitted to the motor controller 18. The motor controller 18, which has a corresponding algorithm software, compares the received electric signals with target values, and then generates corresponding control commands. The control commands are converted into control signals in the form of current, voltage, and the like, and the control signals may be amplified by the amplifier 19 and then transmitted to the actuator 14 of the motor 13, thereby realizing the closed-loop control of the motor 13.

The control host 11 may include a system controller 20 and a user interface 21. The control host 11 may also include a backup power supply 22 for supplying power to the control host 11 and the motor 13 to maintain normal operation of the extracorporeal blood pump system in case of failure of the external power supply. The backup power supply 22 may be an uninterruptible power supply, such as a rechargeable battery. The system controller 20 may include a power electronic circuit. The power electronic circuit may convert AC power into DC power (AC/DC conversion module) and/or convert DC power into appropriate voltage (DC/DC transformation module) by pulse width modulation, and then transmit the converted electric power to the motor driving-control assembly 16 of the motor 13 in the form of low-bandwidth and high-amplitude signals. In the embodiments according to the present disclosure, the control host 11 and the motor 13 can be connected merely by one connection lead. This connection lead can transmit not only electric power, but also command signals from the control host 11 to the motor 13.

By integrating the motor driving-control assembly 16 into the motor 13, high-bandwidth signals (such as drive signals and sensor signals) can be processed in the motor 13 itself, leaving only the low-bandwidth signals (such as power signals and user interface signals) to be processed in the control host 11, which greatly reduces the dependence of the motor 13 on the control host 11 and the requirement for interference resistance of the connection leads. Further, with the motor driving-control assembly 16 being integrated into the motor 13, only one connection lead is required between the control host 11 and the motor 13 to accomplish transmission of electric power and control commands, which can significantly reduce the risk of communication failure between the control host 11 and the motor 13 and thus reduce the risk of abnormal operation of the motor 13. Furthermore, integration of the motor driving-control assembly 16 into the motor 13 enables the motor driving-control assembly 16 to be well protected, because compared with the control host 11, the motor 13 usually has a higher level of environmental protection and is usually used with more care, thus greatly reducing the risk of malfunction of the motor driving-control assembly 16.

Figure 3:
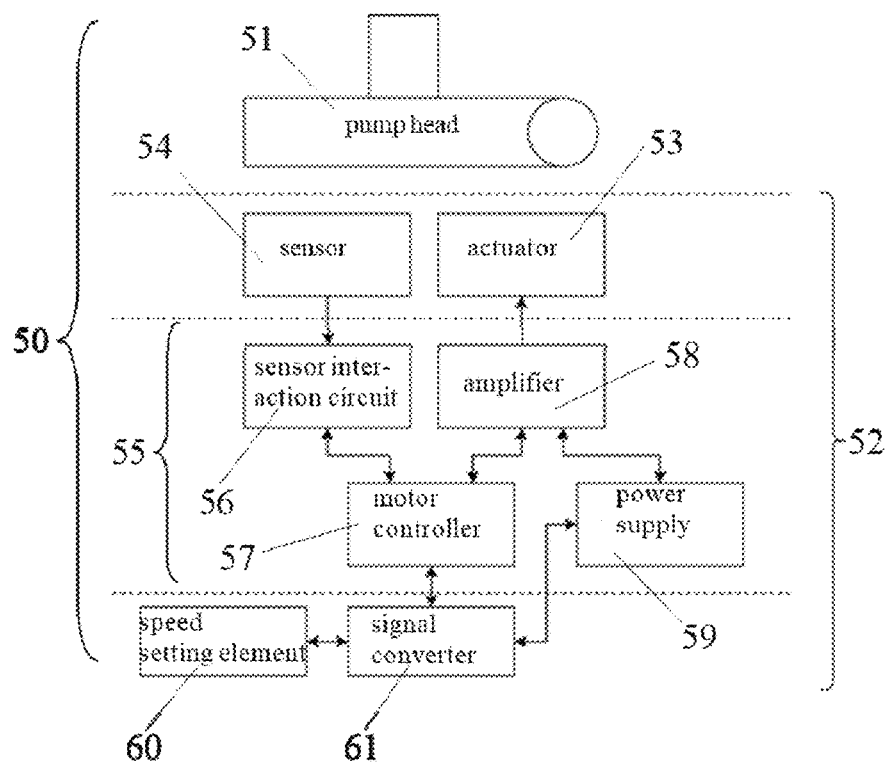
FIG. 3 is a schematic view of an extracorporeal blood pump according to another embodiment of the present disclosure.

FIG. 3 is a schematic view showing an extracorporeal blood pump 50 according to another embodiment of the present disclosure. The extracorporeal blood pump 50 may include a pump head 51, and a motor 52 for driving the pump head 51. The motor 52 may include an actuator 53, a sensor 54, and a motor driving-control assembly 55 integrated in the motor 52. The motor driving-control assembly 55 may include a sensor interaction circuit 56, a motor controller 57, and an optional amplifier 58. The motor driving-control assembly 55 is capable of controlling the motor 52 in a closed loop.

Unlike the extracorporeal blood pump 10, the motor 52 of the extracorporeal blood pump 50 further includes a backup power supply 59 integrated in the motor 52. The backup power supply 59 may be an uninterruptible power supply, such as a rechargeable battery. The backup power supply 59 can supply power to the motor driving-control assembly 55 and the actuator 53 to maintain normal operation of the motor 52 in case of failure of the external power supply.

The motor 52 of the extracorporeal blood pump 50 may be provided with a user interface. The user interface may include an input component and an output component. The input component may include an input element for the user to input any necessary parameters. For example, the input component may include a speed setting element 60 for implementing operations like speed adjustment of the motor 52 and/or starting and stopping of the motor 52. The speed setting element 60 may be in the form of a press button, a knob, a push button, a rocker or a digital setting element, or may be in any other suitable forms. The output component may include any output element that can transmit information to users to meet necessary monitoring functions. For example, the output component may include a display for displaying information on, for example, rotational speed, temperature and operating state of the motor to the user. The output component may also include an indicator (such as a light emitting diode (LED)) or an alarm (such as a buzzer) to prompt or alarm the user with an optical signal or an audio signal.

The motor 52 of the extracorporeal blood pump 50 may include a signal converter 61 integrated in the motor 52. When the user performs an input operation on the motor through the input component of the user interface, the signal converter 61 may convert this input operation into a control signal required by the motor controller 57 and transmit the control signal to the motor controller 57, and when the motor controller 57 feeds back, for example, the operating conditions of the motor 52, to the user, the signal converter 61 may convert the operating conditions fed back by the motor controller 57 into corresponding indication signals and transmit the indication signals to the output component (such as a display, an indicator, an alarm, etc.) of the user interface.

By integrating the backup power supply 59, the user interface, and/or the signal converter 61 or the like in the motor 52, the extracorporeal blood pump 50 can be endowed with more complete functions and operability required for normal operation of the motor, enabling the extracorporeal blood pump 50 to work for at least a period of time independently and safely in case of sudden failure of the control host.

Figure 4:
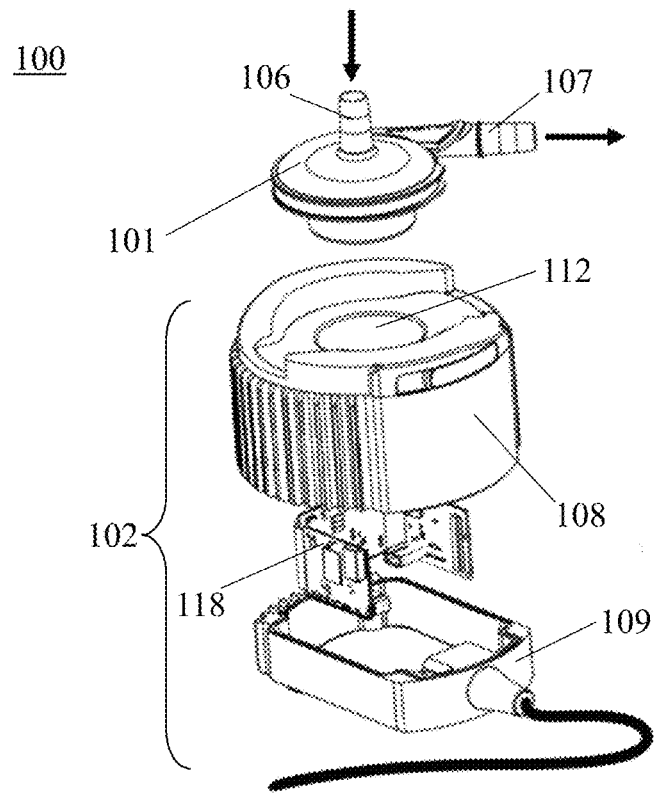
FIG. 4 shows the specific structure of an extracorporeal blood pump according to an embodiment of the present disclosure.
Figure 5:
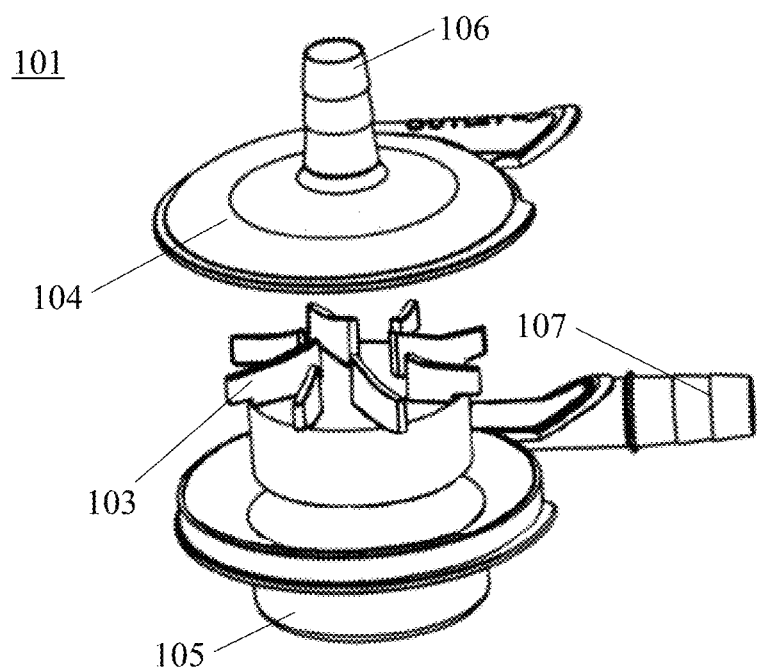
FIG. 5 shows the specific structure of a pump head for the extracorporeal blood pump of FIG. 4.

FIGS. 4 to 8 show specific structures of an extracorporeal blood pump 100 according to an embodiment of the present disclosure. The extracorporeal blood pump 100 may include a pump head 101 and a motor 102. The pump head 101 may include an impeller 103 with a rotor, and two half shells 104 and 105 (as shown in FIG. 5). The impeller 103 is accommodated in an inner space formed by the half shells 104 and 105. The inner space between the half shells 104 and 105 but not occupied by the impeller 103 forms a blood flow channel to allow flow of the blood. The pump head 101 may be provided with an inlet 106 and an outlet 107. Blood can flow into the pump head 101 through the inlet 106, and then, driven by rotation of the impeller 103, flow out of the outlet 107 through the blood flow channel, thereby achieving circulation of the blood.

Referring to FIG. 4, the motor 102 and the pump head 101 are configured to be separable from each other, so that the motor 102 can cooperate with different pump heads 101 for reuse. Medical staff can assemble or disassemble the motor 102 and the pump head 101 on site, so as to assemble a new pump head 101 onto the motor 102 and discard the used pump head 101.

The motor 102 may include a housing, an actuator 112, a sensor 116, and a motor driving-control assembly 118. The actuator 112 and the sensor 116 of the motor 102 may be arranged in the housing of the motor 102. The motor driving-control assembly 118 of the motor 102 is also integrated in the housing of the motor 102.

The housing of the motor 102 may be configured in a generally T-shaped structure with a large upper portion and a small lower portion. This T-shaped structure can provide better hand-held space for users or enable users to grip the motor 102 in the same means as holding a plate, so that users with different hand shapes and sizes can conveniently grip the motor 102 or adjust the direction of the motor 102 in various environments, thus significantly increasing the use convenience of the motor 102.

Figures 6A, 6B:
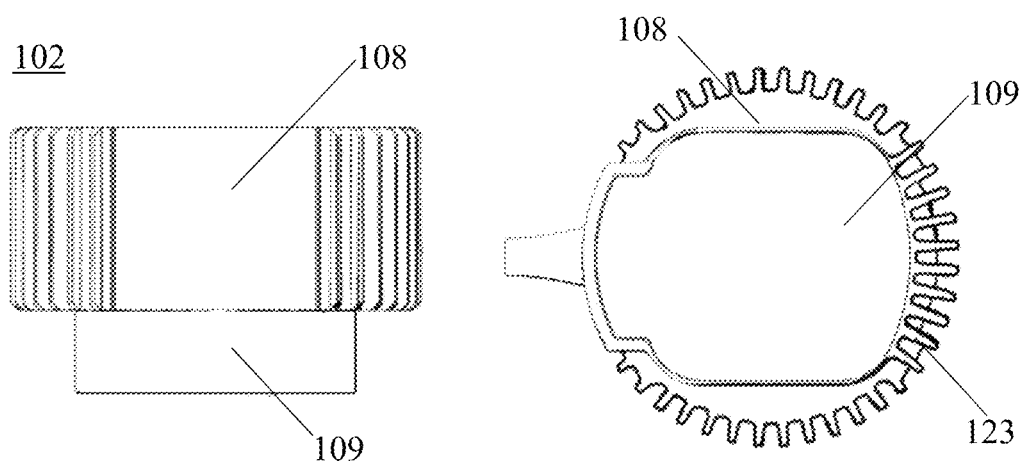
FIGS. 6a and 6b show external views of a motor of an extracorporeal blood pump according to an embodiment of the present disclosure.

The housing of the motor 102 may be configured as one piece, or may be configured to be composed of two or more separate components. For example, in the embodiment shown in FIG. 4, the housing of the motor 102 is configured to include an upper housing 108 and a lower housing 109, wherein an outer circumference of the lower housing 109 may be smaller than that of the upper housing 108, so that the motor 102 assumes a substantially T-shaped structure. Referring to FIGS. 6a and 6b, in the embodiment according to the present disclosure, the upper housing 108 may have a cross section in a substantially circular shape, while the lower housing 109 may have a cross section in the shape of a substantially rounded rectangle. However, the present disclosure is not limited to this, and the cross section of the lower housing 109 may be configured in various shapes such as square, ellipse, pentagon, hexagon, octagon, circle, irregular polygon, irregular shape, etc.

In other embodiments of the present disclosure, the housing of the motor 102 may also be configured to be composed of a left housing and a right housing. The left housing and the right housing may each have a generally T-shaped structure with a large upper portion and a small lower portion. Further, the housing of the motor 102 may also be configured in any other suitable means.

The specific structure of the motor 102 will be described with reference to FIG. 7. In the embodiments according to the present disclosure, the motor 102 may be configured as a magnetic suspension motor. The actuator 112 of the magnetic suspension motor may include a rotation actuator 110 and a suspension actuator 111. The rotation actuator 110 is used to drive the impellers 103 to rotate by driving the rotor 113 of the impeller 103 of the pump head 101. The suspension actuator 111 may include a magnetic suspension bearing for suspending the rotor 113 of the impeller 103. In the case where the motor 102 is configured as a magnetic suspension motor, the impeller 103 does not physically contact or rub against any other components in the working process, thereby avoiding mechanical damages to the blood. Of course, the motor 102 may also be a motor of other types, for example, the motor 102 may be a motor with a conventional contact-type mechanical bearing.

Figure 7:
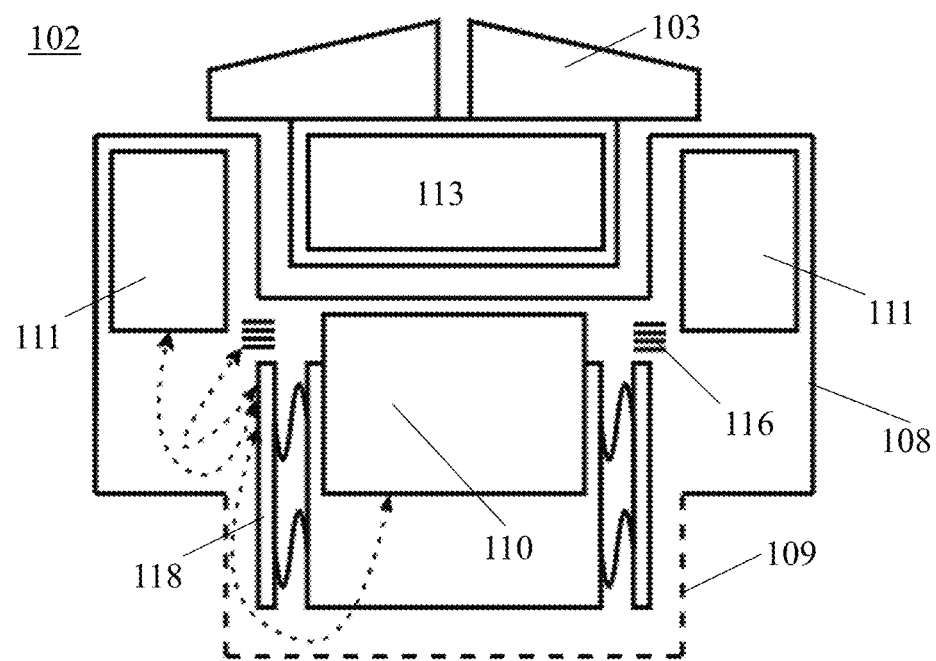
FIG. 7 is a schematic view showing internal structures of a motor of an extracorporeal blood pump according to an embodiment of the present disclosure, in which a "surrounding-type" motor driving-control assembly is shown.

FIG. 7 also shows a sensor 116 located in the housing of the motor 102. In the embodiments according to the present disclosure, the sensor 116 may include a displacement sensor, for example, the sensor 116 may include a rotational displacement sensor for sensing the rotational speed of the rotor 113 for further rotational speed feedback control. In the case where the motor 102 is configured as a magnetic suspension motor, the sensor 116 may further include a radial position and/or displacement sensor, and/or an axial position and/or displacement sensor for sensing the suspending position of the rotor 113 for further suspending position control of the rotor. The radial position and/or displacement sensor and/or axial position and/or displacement sensor for suspending position control of the rotor may be an eddy-current inductive position and/or displacement sensor, which has high sensitivity and is very suitable for sensing the suspending position of the rotor. In other embodiments according to the present disclosure, the sensor 116 may also include a temperature sensor or a sensor for sensing other parameters.

The specific structure and arrangement of the motor driving-control assembly 118 of the motor 102 will be described with reference to FIGS. 4, 7 and 8. The motor driving-control assembly 118 may assume a "surrounding-type" design to minimize its occupation space. The motor driving-control assembly 118 may be integrated onto a circuit board. The circuit board may be configured to include two or more rigid sections and a connection element for connecting the rigid sections. Each of the rigid sections may be used to perform a portion of functions of the motor driving-control assembly 118. The connection element may connect the rigid sections at various suitable angles to endow the circuit board with various configurations. Mutual transmission of signals may occur between the motor driving-control assembly 118 and the actuator 112 (including the rotation actuator 110 and the suspension actuator 111) and the sensor 116 of the motor 102 in a wired or wireless manner (as shown by the dotted lines with arrows in FIG. 7).

Figure 8:
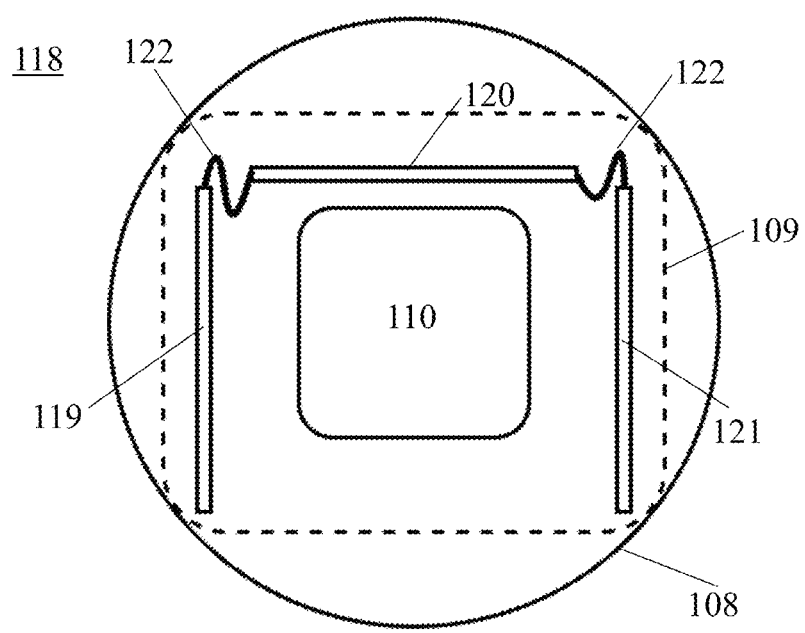
FIG. 8 shows an arrangement of the "surrounding-type" motor driving-control assembly of FIG. 7.
Figure 9:
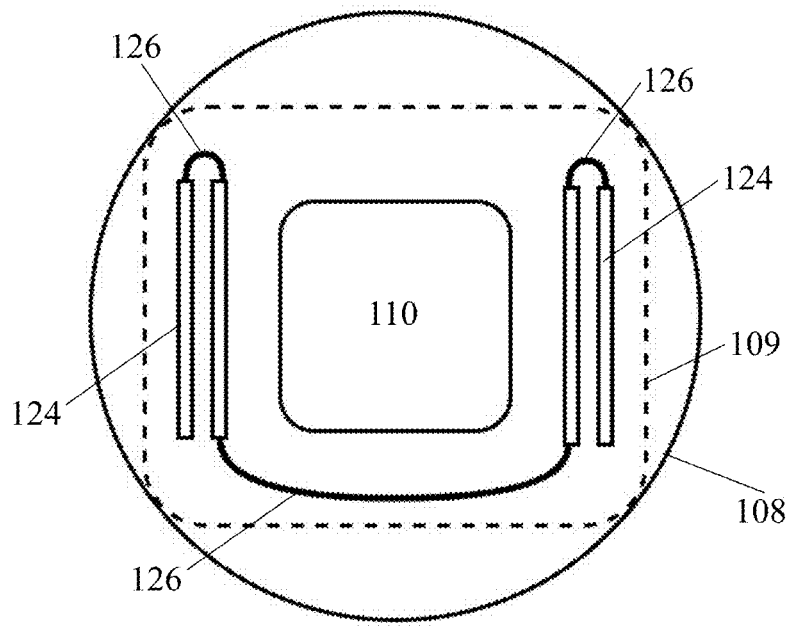
FIGS. 9 to 13 show arrangements of the "surrounding-type" motor driving-control assembly according to other embodiments of the present disclosure.
Figure 10:
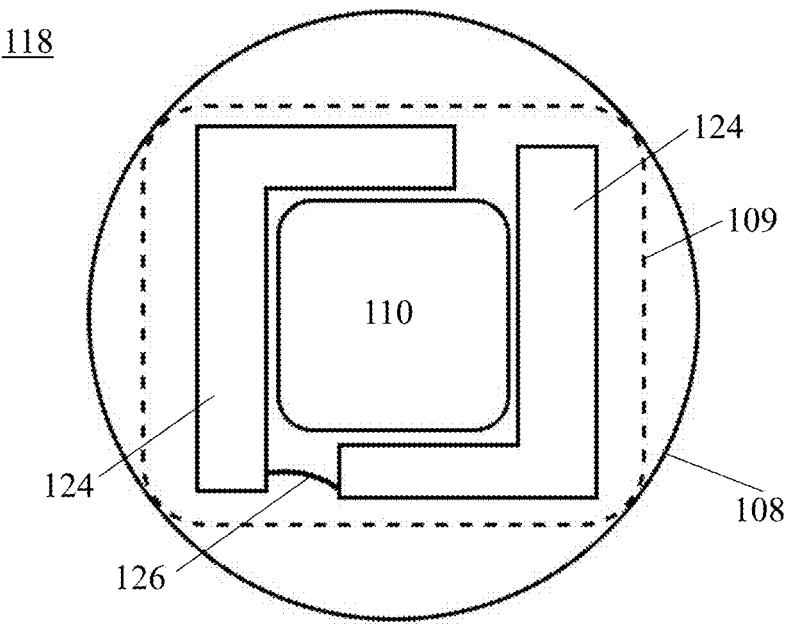
Figure 11:
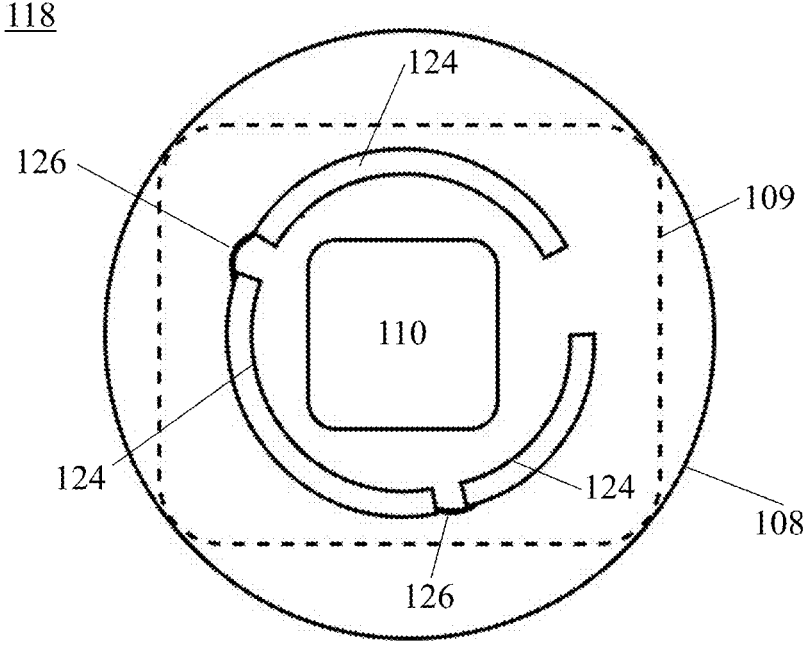
Figure 12:
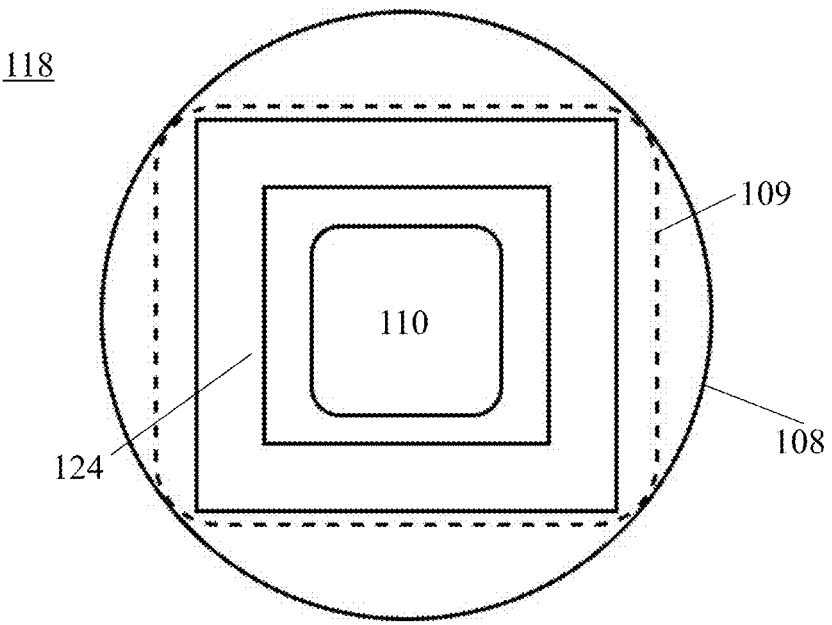
Figure 13:
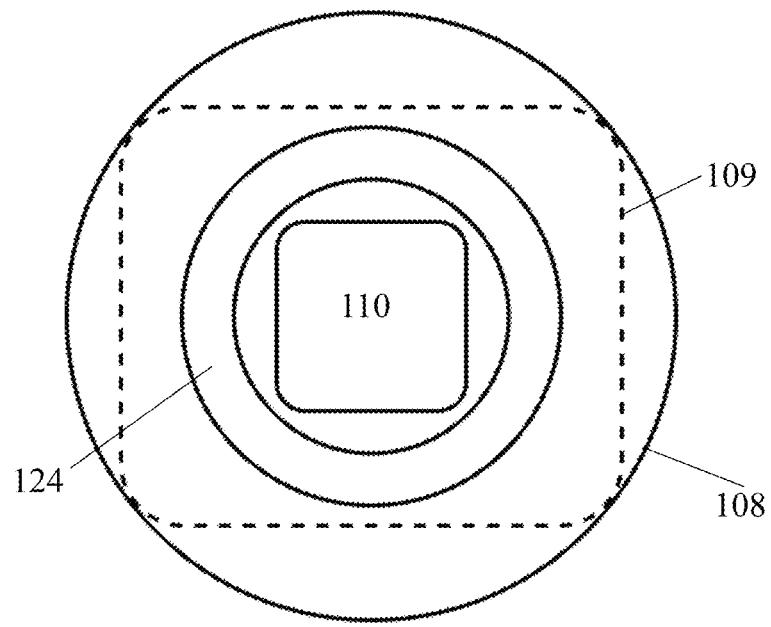

In the embodiment shown in FIGS. 4, 7 and 8, the circuit board on which the motor driving-control assembly 118 is integrated includes three rigid sections 119, 120 and 121. Components of the motor driving-control assembly 118 may be divided into three groups performing different functions and be arranged on the three rigid sections respectively, so that the three rigid sections cooperate with each other to fulfill the entire driving-control function of the motor driving-control assembly 118. For example, the sensor interaction circuit of the motor driving-control assembly 118 may be arranged on the rigid section 119, the motor controller may be arranged on the rigid section 120, and the amplifier may be arranged on the rigid section 121. Alternatively, the motor driving-control assembly 118 may be divided in terms of functional types, wherein comprehensive control components of the motor driving-control assembly 118 are arranged on the rigid section 119, sensor drive components are arranged on the rigid section 120, and power management components are arranged on the rigid section 121, and so on. The components of the motor driving-control assembly 118 may be transistors and/or power integrated circuits, etc. By grouping the components of the motor driving-control assembly 118 and arranging the components in respective groups on different rigid sections of the circuit board, some sensitive components can be kept away from high-power components, thus minimizing the mutual interference between the components as well as the generated noises.

In the embodiments shown in FIGS. 4, 7 and 8, the connection element for connecting the rigid sections 119, 120 and 121 is a flexible circuit board 122. In this embodiment, the flexible circuit board 122 does not perform the driving-control function of the motor driving-control assembly 118, but only serves to transmit signals and/or electric power between the rigid sections 119, 120 and 121. Owing to the presence of the flexible circuit board 122, the motor driving-control assembly 118 may be bent or folded in any suitable shape, so that the motor driving-control assembly 118 can be better adapted to the inner space of the housing of the motor. In this embodiment, the rigid sections 119, 120 and 121 are configured in a general U-shape and vertically arranged around the actuator 112 (the rotation actuator 110 in the embodiment shown in FIG. 7). Of course, the present disclosure is not limited to this, and the rigid sections 119, 120 and 121 may also be arranged around the actuator 112 in a flat-lying way or any other ways.

In other embodiments according to the present disclosure, the connection element for connecting the rigid sections may be a connection plug. The connection plug may be configured to be able to connect any two rigid sections at a suitable angle, so as to construct the motor driving-control assembly into a suitable shape to adapt to the inner space of the housing of the motor. The connection plug may be used to transmit signals and/or electric power between the rigid sections. The connection plug may be rigid.

In other embodiments according to the present disclosure, the connection element for connecting the rigid sections may also be a flexible circuit board for performing a portion of functions of the motor driving-control assembly 118.

In the embodiments according to the present disclosure, the components such as transistors and/or power integrated circuits of the motor driving-control assembly 118 may be in contact with the housing of the motor 102, so that heat from the components such as transistors and/or power integrated circuits can be dissipated through the housing of the motor 102. The motor driving-control assembly 118 may also be configured such that the circuit board is in contact with the housing of the motor 102 (in this instance, there may be other thermally conductive materials, such as thin thermally-conductive sheets, between the circuit board and the housing of the motor 102), to allow heat from the components such as transistors and/or power integrated circuits to be dissipated through thermal paths formed on the circuit board and the housing of the motor 102. In the case where the circuit board includes rigid sections, the rigid sections of the circuit board may be brought into contact with the housing of the motor 102 (in this instance, there may be other thermally conductive materials such as thin thermally-conductive sheets between the rigid sections and the housing of the motor 102), so that heat from components such as transistors and/or power integrated circuits can be dissipated through thermal paths formed on the rigid sections of the circuit board and the housing of the motor 102. In order to enhance heat dissipation, a heat dissipation enhancement structure 123 (as shown in FIG. 6) may also be arranged on the outer side of the housing of the motor 102. The heat dissipation enhancement structure 123 may include at least one heat dissipation fin or rib. The heat dissipation enhancement structure 123 may be integrally formed with the housing of the motor 102. The heat dissipation enhancement structure 123 may be arranged outside an area of the housing of the motor 102 that is in contact with the components such as transistors and/or power integrated circuits of the motor driving-control assembly 118 or that is in contact with the rigid sections of the circuit board, so as to dissipate heat more quickly.

FIGS. 9 to 13 show arrangements of the "surrounding-type" motor driving-control assembly according to other embodiments of the present disclosure. In the embodiment shown in FIG. 9, the circuit board 124 on which the motor driving-control assembly is integrated includes four rigid sections, evenly arranged on two opposite sides of the actuator 112 of the motor 102. The four rigid sections are connected with each other through connection elements 126. In the embodiment shown in FIG. 10, the circuit board 124 on which the motor driving-control assembly is integrated includes two rigid sections. Each rigid section is configured in a substantial L-shape, so the two rigid sections can be connected into a substantially rectangular shape by the connection element 126. In the embodiment shown in FIG. 11, the circuit board 124 on which the motor driving-control assembly is integrated includes three rigid sections. Each rigid section is configured in an arc shape, so the three rigid sections can be connected into a substantially circular or semi-circular shape by the connection element 126. In the embodiments shown in FIGS. 12 and 13, the circuit board 124 on which the motor driving-control assembly is integrated has a one-piece structure. In the embodiment shown in FIG. 12, the circuit board 124 with a one-piece structure is configured in a substantially rectangular shape, whereas in the embodiment shown in FIG. 13, the circuit board 124 with a one-piece structure is configured in a circular shape.

In the embodiments shown in FIGS. 9 to 13, the circuit board 124 or each rigid section of the circuit board 124 may be vertically arranged around the actuator of the motor 102, or may be horizontally or otherwise arranged around the actuator of the motor 102. The circuit board 124 may also be configured to be of other arrangements, for example, in irregular shapes, which are different from those shown in FIGS. 9 to 13. Further, the connection element 126 may be configured as a flexible circuit board or a connection plug. The connection plug may be rigid.

Figure 14:
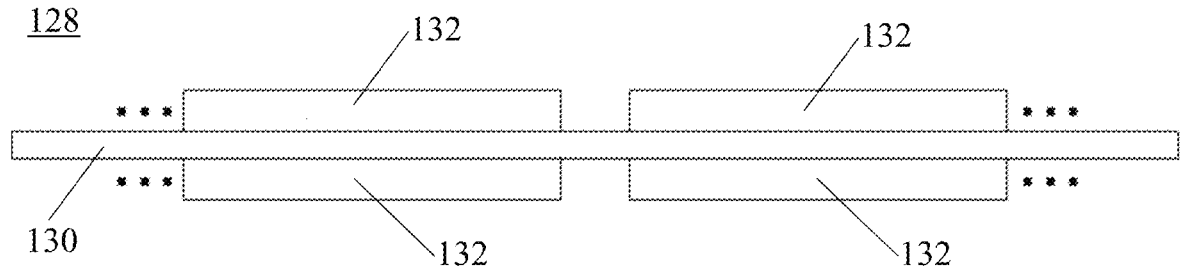
FIG. 14 shows the specific structure of the motor driving-control assembly according to an embodiment of the present disclosure.

Referring to FIG. 14, in an embodiment according to the present disclosure, the circuit board 128 on which the motor driving-control assembly is integrated may include an extended flexible circuit board layer 130 for transmitting signals and/or electric power, and a rigid circuit board layer 132 for performing the driving-control function of the motor driving-control assembly. The rigid circuit board layer 132 may be arranged on at least one side of the flexible circuit board layer 130 (in the embodiment shown in FIG. 14, it is arranged on both sides of the flexible circuit board layer 130) and include two or more rigid sections separated from each other. Such multi-layer structural design not only enables the circuit board 128 to form a complete circuit system, which cannot be directly separated by non-destructive means, but also allows the circuit board 12 to be bent or folded more easily. Such multi-layer structural design provides at least the following advantages: 1) avoiding the interference between signals with a compact structure, so as to better accomplish signal transmission; 2) avoiding use of the connection element (for example, the connection plug, which is easy to loosen after frequent uses), thus having higher reliability; and 3) providing better flexibility in spatial arrangement, thereby capable of reducing volume to great extent.

In the embodiment where the circuit board includes two or more rigid sections, each rigid section may also be configured to include an extended flexible circuit board layer for transmitting signals and/or electric power, and a rigid circuit board layer for performing a portion of driving-control functions of the motor driving-control assembly. The rigid circuit board layer may be arranged on at least one side of the flexible circuit board layer (for example, may be arranged on both sides of the flexible circuit board layer to form a sandwiched structure). The flexible circuit board layers may be connected together via connection elements, so as to realize interconnection between the rigid sections. Such multi-layer structural design can further enhance the flexibility of the circuit board while avoiding interference between the signals.

Figure 15:
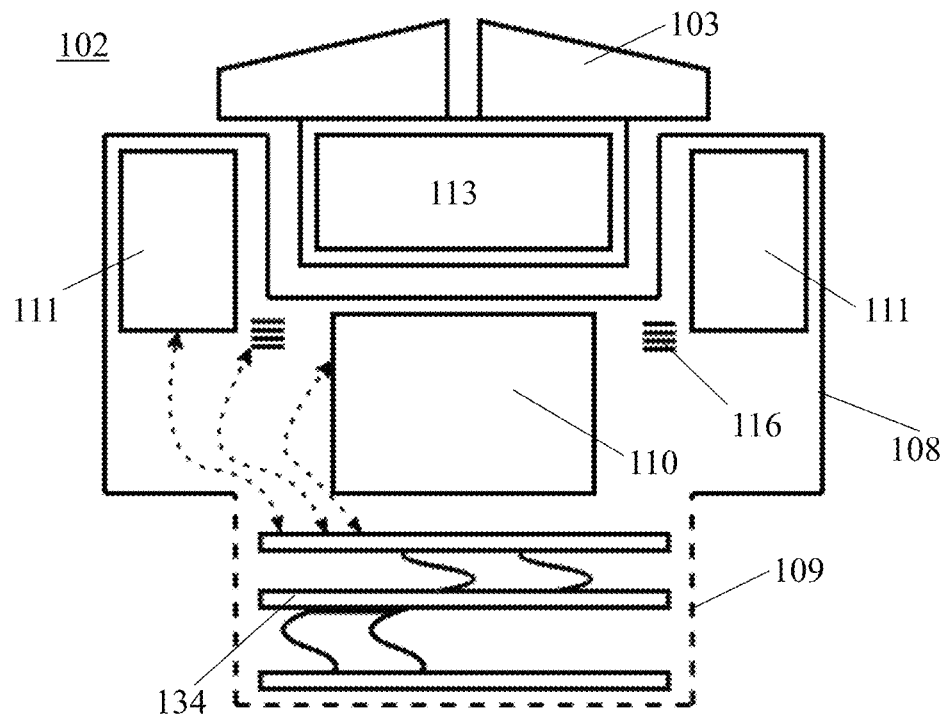
FIG. 15 is a schematic view showing internal structures of a motor of an extracorporeal blood pump according to another embodiment of the present disclosure, in which a "stacked" motor driving-control assembly is shown.
Figure 16:
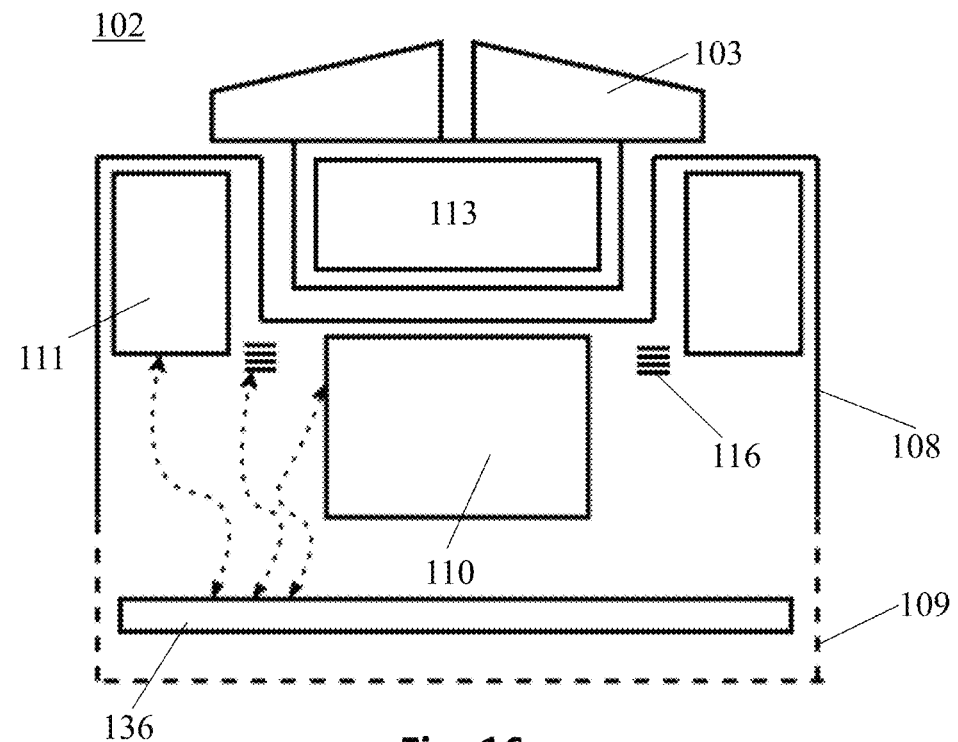
FIG. 16 is a schematic view showing internal structures of a motor of an extracorporeal blood pump according to a further embodiment of the present disclosure, in which a "flat-lying type" motor driving-control assembly is shown.

FIGS. 15 and 16 show two other arrangements of the motor driving-control assembly. In the embodiment shown in FIG. 15, the circuit board 134 on which the motor driving-control assembly is integrated includes multiple rigid sections. The plurality of rigid sections lie flat under the actuator 112 of the motor in a stacked manner. In the embodiment shown in FIG. 16, the circuit board 136 on which the motor driving-control assembly is integrated has an integral structure, and the circuit board 136 lies flat under the actuator 112 of the motor.

Although the exemplary embodiments of the present disclosure have been described above with reference to the accompanying drawings, those skilled in the art should understand that the present disclosure is not limited to the specific structure that has been disclosed. Multiple changes and modifications may be made to the exemplary embodiments without substantively departing from the spirit and scope of the present invention. Accordingly, all the changes and modifications are encompassed within the protection scope as defined by the claims of the present invention.

What is claimed is:

1. A motor for an extracorporeal blood pump, the motor comprising:
   a motor housing;
   an actuator located in the motor housing and configured to drive an impeller in a pump head of the extracorporeal blood pump;
   at least one sensor located in the motor housing; and
   a motor driving-control assembly located in the motor housing and configured to control operation of the motor, wherein:
      the motor driving-control assembly is integrated on a circuit board, the circuit board includes at least two rigid sections and a connection element for connecting the at least two rigid sections, the connection element is capable of connecting the at least two rigid sections; and
      components of the motor driving-control assembly are divided into a plurality of groups that are respectively arranged on different rigid sections of the at least two rigid sections, such that each rigid section of the at least two rigid sections is configured to be used to perform a portion of driving-control functions of the motor driving-control assembly.

2. The motor of claim 1, wherein the motor driving-control assembly comprises a sensor interaction circuit and a motor controller, the sensor interaction circuit configured to receive sensing signals from at least one of the at least one sensor and configured to transmit the sensing signals to the motor controller, and wherein the motor controller is configured to send corresponding control signals to the actuator based on the received sensing signals; and wherein the motor driving-control assembly further comprises an amplifier configured to amplify the control signal from the motor controller and configured to transmit the amplified control signal to the actuator.

3. The motor of claim 1, further comprising a backup power supply integrated in the motor housing, the backup power supply configured to supply electric power to the motor driving-control assembly and the actuator to maintain normal operation of the motor in case of failure of external power supplies.

4. The motor of claim 1, wherein the connection element is configured as a flexible circuit board for transmitting signals and/or electric power between the at least two rigid sections, or is configured as a connection plug for transmitting signals and/or electric power between the at least two rigid sections, or is configured as a flexible circuit board for performing a portion of driving-control functions of the motor driving-control assembly.

5. The motor of claim 1, wherein each rigid section of the at least two rigid sections comprises a rigid circuit board layer and an extended flexible circuit board layer, the rigid circuit board layer being arranged on at least one side of the flexible circuit board layer, and the flexible circuit board layers being connected together via the connection element, and wherein the extended flexible circuit board layer is configured to transmit signals and/or electric power, while the rigid circuit board layer is used to perform a portion of driving-control functions of the motor driving-control assembly.

6. The motor of claim 1, wherein the circuit board comprises a rigid circuit board layer and an extended flexible circuit board layer, the rigid circuit board layer being arranged on at least one side of the extended flexible circuit board layer and comprising two or more rigid sections separated from each other, such that the circuit board is capable of being bent or folded by means of the flexible circuit board layer, and wherein the extended flexible circuit board layer is configured to transmit signals and/or electric power, while the rigid circuit board layer is configured to be used to perform driving-control functions of the motor driving-control assembly.

7. The motor of claim 1, wherein the circuit board is arranged vertically or horizontally around the actuator in a general U-shape, or in rectangular, circular, semi-circular, or irregular shape, or the circuit board lies flat on one side of the actuator in a stacked manner.

8. The motor of claim 1, wherein the motor driving-control assembly comprises transistors and/or power integrated circuits, the transistors and/or power integrated circuits being mounted on the circuit board; and
wherein the transistors and/or the power integrated circuits are in contact with the motor housing to allow heat from the transistors and/or the power integrated circuits to be dissipated through the motor housing; or the circuit board is in contact with the motor housing, such that heat from the transistors and/or the power integrated circuits is capable of being dissipated through thermal paths formed on the circuit board and the motor housing.

9. The motor of claim 8, wherein a heat dissipation enhancement structure is arranged on an outer side of the motor housing, and wherein the heat dissipation enhancement structure comprises at least one heat dissipation fin or rib.

10. The motor of claim 1, wherein the motor housing is of a T-shaped structure, and wherein the motor housing is configured in one piece or formed by a plurality of components.

11. The motor of claim 1, wherein the motor is configured as a magnetic suspension motor with a magnetic suspension bearing configured to suspend a rotor of the impeller.

12. The motor of claim 11, wherein:
the at least one sensor comprises a rotational displacement sensor configured to sense a rotational speed of the rotor;
the at least one sensor comprises at least one of an axial position sensor, a displacement sensor, or a radial position sensor configured to sense a suspending position of the rotor; or
the at least one sensor comprises a temperature sensor.

13. The motor of claim 1, wherein the motor further comprises a user interface comprising an input component and an output component, the input component comprising a speed setting element configured to implement speed adjustment of the motor and/or starting and stopping the motor, and the output component comprising at least one of a display, an indicator, or an alarm; and/or the motor further comprises a signal converter.

14. An extracorporeal blood pump, comprising:
a pump head comprising an impeller with a rotor; and
a motor configured to drive the impeller to rotate via the rotor, the motor comprising:
a motor housing;
at least one sensor located in the motor housing;
an actuator located in the motor housing and configured to drive the impeller; and
a motor driving-control assembly located in the motor housing and configured to control operation of the motor, wherein:
the motor driving-control assembly is integrated on a circuit board, the circuit board includes at least two rigid sections and a connection element for connecting the at least two rigid sections, the connection element is capable of connecting the at least two rigid sections; and
components of the motor driving-control assembly are divided into a plurality of groups that are respectively arranged on different rigid sections of the at least two rigid sections, such that each rigid section of the at least two rigid sections is configured to be used to perform a portion of driving-control functions of the motor driving-control assembly.

15. An extracorporeal blood pump system, comprising:
an extracorporeal blood pump, comprising:
a pump head comprising an impeller with a rotor; and
a motor configured to drive the impeller to rotate via the rotor, the motor comprising:
a motor housing;
at least one sensor located in the motor housing;
an actuator located in the motor housing and configured to drive the impeller; and
a motor driving-control assembly located in the motor housing and configured to control operation of the motor, wherein:
the motor driving-control assembly is integrated on a circuit board, the circuit board includes at least two rigid sections and a connection element for connecting the at least two rigid sections, the connection element is capable of connecting the at least two rigid sections; and
components of the motor driving-control assembly are divided into a plurality of groups that are respectively arranged on different rigid sections of the at least two rigid sections, such that each rigid section of the at least two rigid sections is configured to be used to perform a portion of driving-control functions of the motor driving-control assembly; and
a control host, wherein the control host comprises a power electronic circuit configured to send electric power and command signals to the extracorporeal blood pump, and wherein the control host is connected with the motor of the extracorporeal blood pump by one connection lead, which is capable of transmitting both electric power and command signals to the motor of the extracorporeal blood pump.

\* \* \* \* \*